Jan. 27, 1953        C. V. MORINE        2,626,578
TRANSPLANTING MACHINE
Filed Sept. 17, 1945        5 Sheets-Sheet 1

INVENTOR.
CHARLES V. MORINE,
BY Lyon & Lyon
ATTORNEYS.

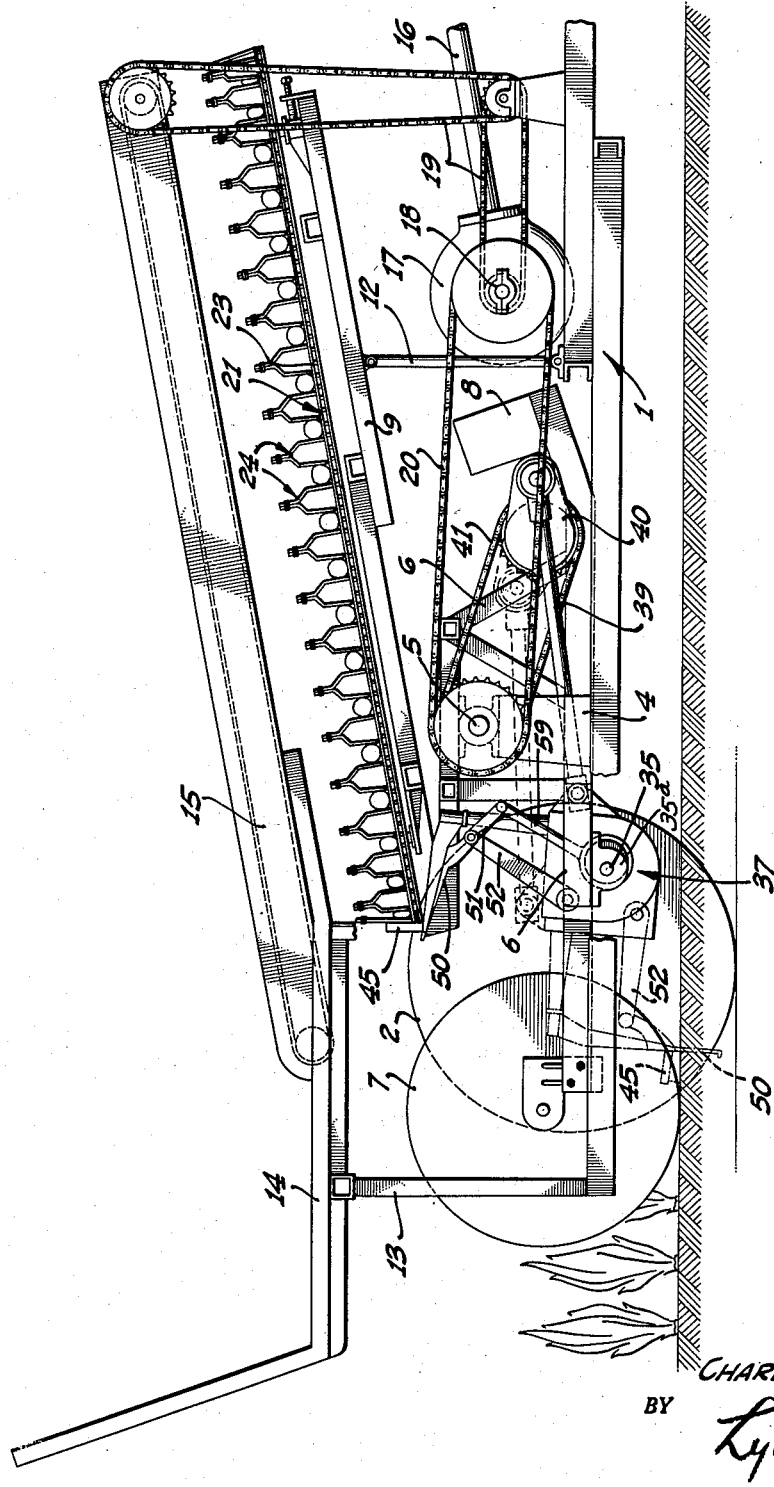

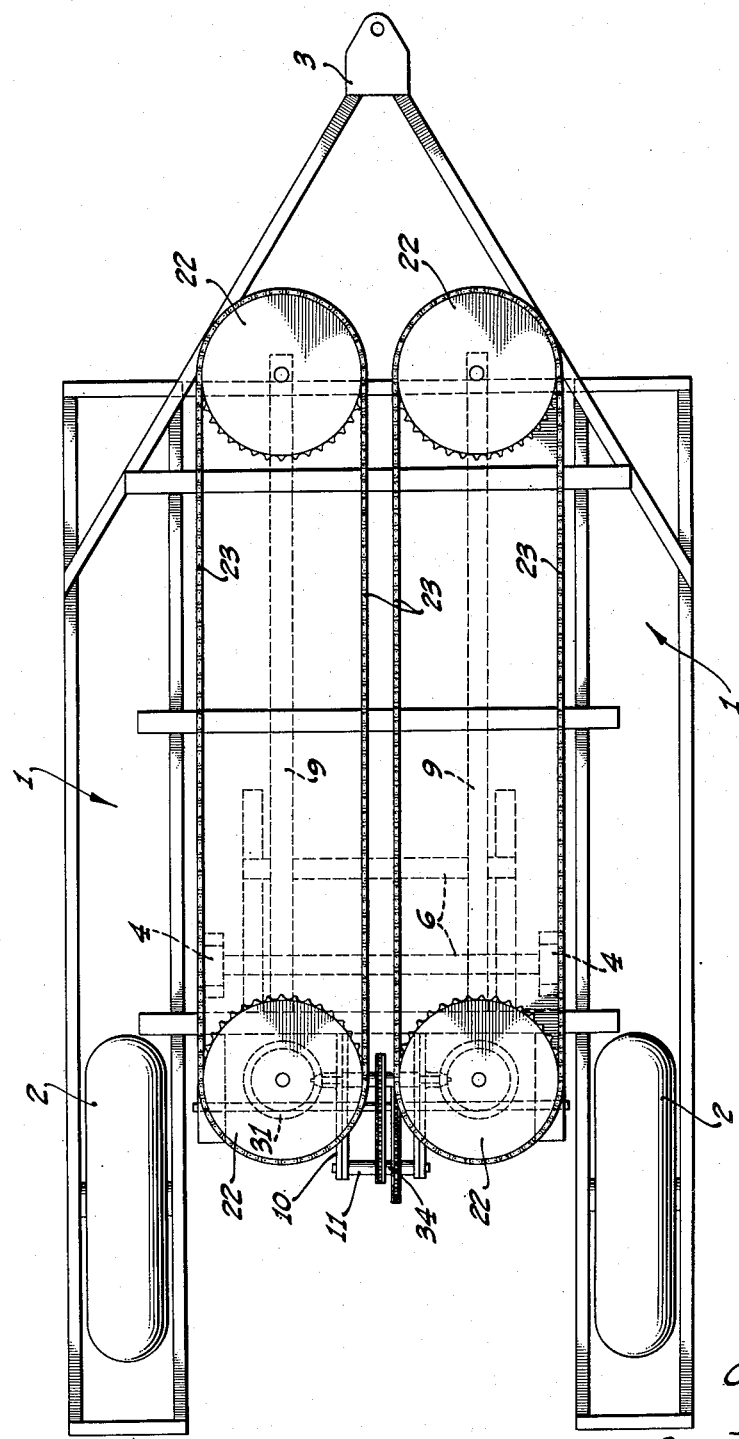

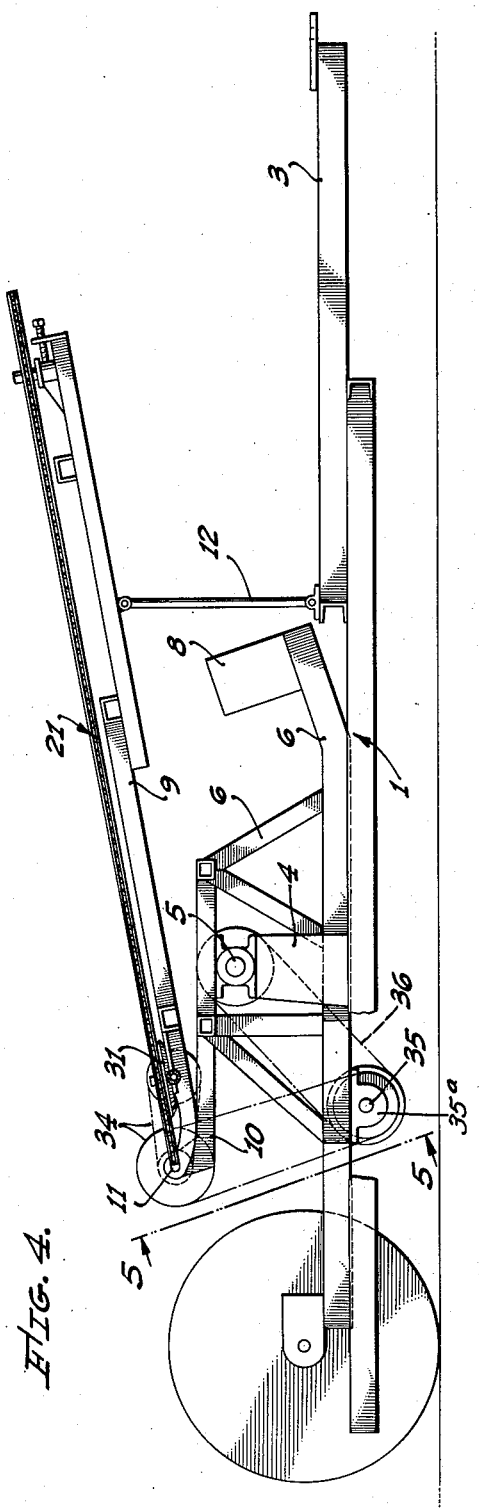

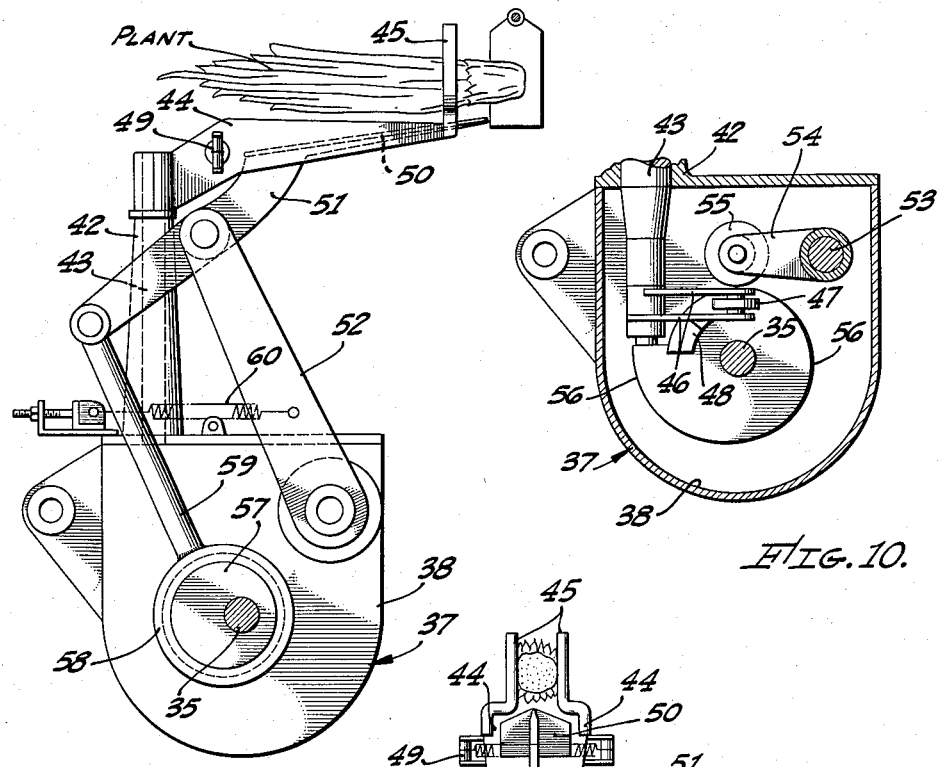

Patented Jan. 27, 1953

2,626,578

UNITED STATES PATENT OFFICE 2,626,578

TRANSPLANTING MACHINE

Charles V. Morine, Wahiawa, Oahu, Territory of Hawaii, assignor to California Packing Corporation, San Francisco, Calif., a corporation of New York Application September 17, 1945, Serial No. 616,817

12 Claims. (Cl. 111—3)

My invention relates to transplanting machines which may be adapted to the setting out of young plants of any character, but is particularly directed to the planting of young pineapple shoots. On a pineapple plantation, after a field has been prepared, mulch paper is laid in strips with uniform walking spaces between them. The young plants or shoots are obtained from mother plants and other growing fields. These shoots may be slips, suckers, or tops, and range in length from 12" to 20" and have a butt or root end about 1" to 2" in diameter.

The plants are conventionally set out manually, that is, a laborer by use of a ground penetrating iron, opens a hole through the mulch paper and into the ground, and sets the plant or shoot therein. This is an extremely strenuous and arduous task, and in any event, is slow. With this preamble in mind, the objects of my invention are:

First, to provide a transplanting machine which eliminates the burdensome and strenuous manual task of transplanting, the machine being capable of towage behind a tractor so that the transplanting may be accomplished rapidly.

Second, to provide a machine of this character which sets the shoots or plants at a uniform depth in the soil and with uniform spacing, and in every respect fully as satisfactorily for the purposes of growth as has previously been accomplished by manual transplanting.

Third, to provide a machine of this character wherein the shoots or plants are placed in a bin or platform carried by the machine, and carried therefrom to a point accessible to a field-hand riding upon the machine and who places the plants in the feeding mechanism of the machine, all this being accomplished while the machine is in motion along the field.

Fourth, to provide a transplanting machine which incorporates a novel transplanter unit adapted to grasp individual plants, prepare an opening in the ground therefor, and insert the plant into the prepared opening, all during continuous travel of the machine.

With the above and other objects in view as may appear hereinafter, reference is directed to the accompanying drawings in which:

Fig. 2 is a longitudinal sectional view thereof taken approximately along the line 2—2 of Fig. 1.

Fig. 3 is a plan view similar to Fig. 1, but with the machine only partially assembled to illustrate the manner of driving the feeding table conveyors.

Fig. 4 is a fragmentary side view thereof similar to Fig. 2, but also showing the machine partially assembled to illustrate the feeding table conveyor.

Fig. 5 is an end elevational view of the feeding table conveyor and its drive mechanism taken approximately along the line 5—5 of Fig. 4.

Fig. 6 is a detailed view taken through 6—6 of Fig. 7, showing the plantgripping means carried by the feeding table conveyor.

Fig. 7 is a fragmentary top or plan view thereof with portions in section.

Fig. 8 is an enlarged view of one of the transplanting units taken from the rear side thereof and looking forward, the transplanting unit being shown in its planting receiving position.

Fig. 9 is a side view thereof in its plant receiving position.

Fig. 10 is a fragmentary sectional view thereof through 10—10 of Fig. 8.

Figure 1:
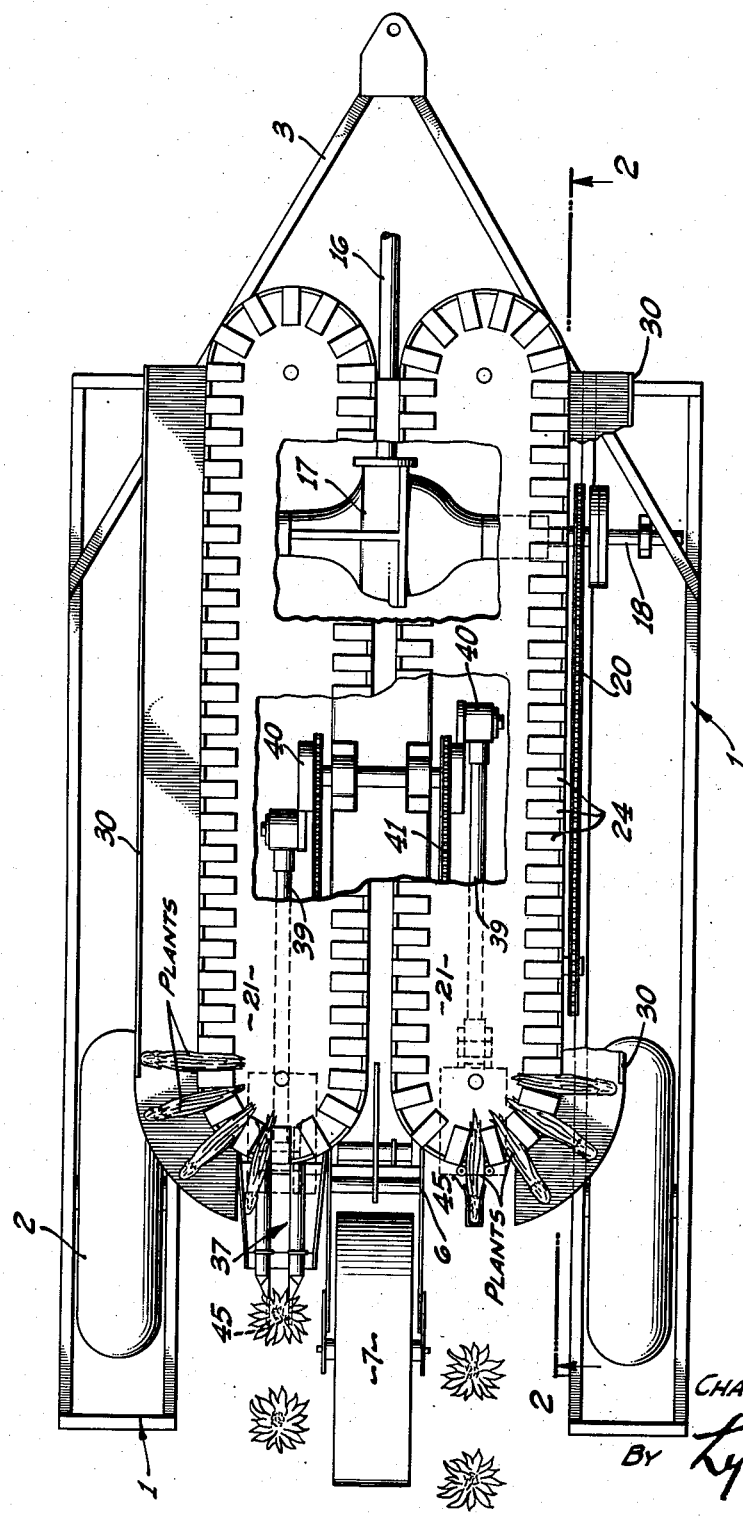
Fig. 1 is an essentially diagrammatical or idealized plan view of the machine.

My transplanting machine includes a generally U-shaped outer frame structure 1. The outer frame is supported at the rear extremities of its legs by wheels 2, and is provided at its forward end with a suitable tractor hitch 3. Forwardly of but adjacent the wheels 2, the outer frame 1 is provided with a pair of pedestals 4 which support a transverse shaft 5. The shaft 5 forms a part of a gear and chain drive means, and also functions as a fulcrum shaft for an inner frame 6 preferably of welded steel construction.

The inner frame 6 is suspended on the shaft 5 intermediate its ends. The rear extremity of the inner frame 6 projects between the wheels 2 and is equipped with a wheel or roller 7 adapted to roll on the mulch paper between and slightly rearwardly of the wheels 2. The inner frame 6 projects forwardly of the shaft 5 between the legs of the outer frame 1, and is provided with a counterbalance 8.

Disposed above the frames 1 and 6 is a feed table frame 9 which is inclined and pivotally supported at its rear or lower end from a hinge bracket 10 projecting from the inner frame 6. A journal shaft 11 connects the feed table frame 9 to the hinge bracket 10. In addition, struts 12 located near the forward end of the feed table frame, are pivotally connected to the feed table frame and to the outer frame 1. By this means the inner frame 6 is capable of oscillation to a limited extent with respect to the outer frame, and the rear end of the feed table frame 9 remains in substantially fixed relation to the inner frame and moves upwardly and downwardly therewith.

The rear extensions of the outer frame 1 support by means of uprights 13, a loading platform 14 shown fragmentarily in Fig. 2. The shoots or plants are deposited on this platform. A belt conveyor unit 15 is journaled by one end from the loading platform 14 and extends forwardly and upwardly therefrom over the feed table frame 9. The forward end of the belt conveyor unit 15 is supported by suitable struts (not shown) from the forward end of the outer frame 1.

A power take-off shaft 16 extends rearwardly from the tractor (not shown) employed to tow the transplanting machine. The power take-off shaft enters a gear housing 17 supported by the outer frame 1 and is geared to a transverse shaft 18. A chain drive 19 which may include a countershaft, connects the transverse shaft 18 with the upper or forward end of the belt conveyor 15. A second chain drive 20 connects the shaft 18 with the shaft 5.

The feeding table frame 9 supports a pair of feeding table conveyors 21. Each feeding table conveyor includes a forward and a rearward sprocket 22 which rotate about axes normal to the slope of the base of the feed table frame 9. Chains 23 extend around these sprockets 22. Feeding table conveyors 21 are driven in such a manner as will be described hereinafter, that the adjacent lengths of chain move forwardly and the outboard lengths of chain move rearwardly. Suitable platforms (not shown) for workmen to stand upon, are carried by the outer frame 1 so that workmen standing thereon may reach shoots carried rearwardly on the belt conveyor unit 15 and place them on the feeding table conveyors 21. The plants are placed between plant holders 24 carried by the chains 23.

Each plant holder, as shown best in Figs. 6 and 7, includes a base plate 25 secured to the chain 23 and on which are mounted a pair of rigid upright members 26. The upper portions of the uprights are offset slightly and provided with sleeves 27 extending transversely to the chain 23. Each sleeve journals a pin extending laterally from a pivoted upright 28 which is similar to the rigid upright, except that its lower end is free to swing in the direction of the chain 23 to and from the rigid upright 26. Springs or yieldable bands 29 extend around the upper extremities of each rigid upright and its adjacent pivoted upright.

The plant holders are positioned adjacent each other so that the pivoted upright of one holder is yieldably urged toward the rigid upright of the adjacent holder forming a yieldable clamp means into which may be placed the shoot or plant picked from the belt conveyor unit 15, as indicated by dotted lines in Fig. 6. The pair of uprights comprising each plant holder, thus dispose the plants in laterally outwardly directed relation along the feeding table conveyors 21, so that as the plants move downwardly and rotate about the rearward sprockets 22, they move into a rearwardly directed position.

As will be brought out hereinafter, the butt or root ends of the plants should project a fixed distance laterally from the feeding conveyors. This is accomplished by use of a stop wall 30 extending along the outer sides of the conveyors in predetermined spaced relation thereto.

The feeding table conveyors 21 are actuated by a drive mechanism which includes bevel gears 31 located under the rear sprockets 22. The pair of bevel gears 31 are engaged by pinion gears 32 mounted on the extremities of a countershaft 33 disposed transversely with respect to the transplanting machine. The countershaft is connected by a chain drive 34 to a transplanter unit shaft 35 supported from the inner frame 6 forwardly of the wheel 7 by bearings 35a. The shaft 35 is in turn driven by a chain drive 36 from the shaft 5.

The shaft 35 journals on either side of the inner frame 6 a pair of transplanter units 37. Each transplanter unit includes a housing 38 having a bracket on one side to which is attached a connecting rod 39 which extends forwardly to a crankshaft 40 carried by the inner frame 6 of its fulcrum shaft 5. The throws of the crankshafts 40 to which the connecting rods 39 are joined, are preferably displaced 180°. The crankshaft 40 is connected by a chain drive 41 to the shaft 5.

The housing 38 of each transplanter unit is adapted to be moved by the action of the connecting rods 39 in approximately a 90° arc that is between a plant receiving position and a plant depositing position. Each housing 38 is provided with a pair of sleeves 42 which are directed upwardly when the housing is in its plant receiving position. Each sleeve 42 journals a shaft 43, the outer end of which is equipped with a gripping arm 44. The gripping arms of the two shafts 43 extend rearwardly from the shafts when the transplanter unit is in its plant receiving position, and terminate in upturned fingers 45 adapted to grasp a plant near its butt or root end as the plant is moved into a rearwardly directed position by the corresponding feeding table conveyor 21.

The shaft 43 extends into the housing 38 and is provided with arms 43 which carry rollers 47 adapted to bear against axially directed cam faces 48 provided on the sides of a cam wheel secured to the shaft 35. A tension spring 49 extends between the gripping arms 44 so that the fingers 45 normally tend to grasp the plant.

A ground penetrating blade or arm 50 is adapted to move longitudinally between and beyond the gripping arms 44. The ground penetrating blade is provided with a yoke 51 which extends rearwardly and downwardly on opposite sides of the sleeves 42. The yoke is pivotally supported intermediate its ends by a pair of levers 52 which extend upwardly from the sides of the housing 38 and are secured to a cross-shaft 53, extending through the housing 38 parallel with the shaft 35. Within the housing 38 the cross-shaft 53 carries an arm 54 and a roller 55, which rides on a radial cam 56 provided on the radial surface of the cam wheel secured to the shaft 35.

Outwardly of each housing 38 the shaft 35 carries an eccentric 57 on which is journalled a ring 58 connected by an arm 59 to the corresponding extremity of the yoke 51. As will be brought out hereinafter, the ground penetrating blade 50 is moved in one direction by the action of the levers 52 and is moved in the opposite direction by a spring 60 secured to the levers 52 and to the housing 38.

Operation of my transplanting machine is as follows:

The pineapple plants or shoots are placed on the loading platform 14 from which they are fed by hand onto belt conveyor 15. Workmen, standing alongside the feeding table conveyors, pick the shoots from the belt conveyor 15 and place them between the plant holders 24 with the root or butt ends of the plants against the stop walls 30. The plants are moved downwardly and rearwardly by feeding table conveyors and move around the lower sprockets 22 until the plants are positioned with their butt ends facing rearwardly.

The transplanter units 37 are driven in synchronism with the movement of the feeding table conveyors so that as each plant reaches its rearwardly directed position, the corresponding transplanter unit has rotated to its plant receiving or forward position shown by solid lines in Figures 2 and 9. In this position the fingers 45 are spread by reason of engagement by the rollers 47 with the elevated portions of the axially facing cam surfaces 48. As soon as the fingers 45 are in position, the rollers 47 ride free of their cams permitting the tension spring 49 to close the fingers 45 against the leafy portions of the plant and withdraw the plant from its holder 24. In this position of the transplanter unit 37, the ground penetrating blade or arm 50 is retracted.

The transplanter unit 37 thereon turns rapidly about the axis of the shaft 35 to its rearwardly or transplanting position shown by broken lines in Figure 2. In the course of this movement the arms 54 cause the levers 52 to move the ground penetrating arm or blade toward its extended position so that the extended portion of the blade is driven into the ground and thereby prepares a hole of sufficient size to receive the root end of the plant. The blade not only moves in response to the levers 52 but is pivoted about the angles defined by the junctures of the levers 52 with the yoke 51. This pivotal movement is accomplished by the eccentric action of the arms 59. The pivotal movement thus provided reduces the forward travel of the blade which would otherwise occur due to the forward movement of the planting machine. In this connection it should be noted that the transplanting machine moves continuously down the field.

The fingers 45 which grasp the pineapple plant or shoot move downwardly until they have forced the root end of the plant into the hole prepared by the ground penetrating blade. The fingers are thereupon released by reason of engagement of the rollers 47 with the elevated portions of the axially facing cam surfaces 48, and the fingers remain spaced during the upward or return travel of the transplanter unit, that is, during movement between the broken line position and the solid line position shown in Figure 2.

It is preferred to arrange the transplanter units so that they work alternately; that is, one transplanter unit is in the process of receiving a plant at the time the other transplanter unit is depositing its plant in the ground.

By reason of the fact that the transplanter units are mounted on an inner frame supported by the wheel 7 and the fact that the rear ends of the feeding table conveyors 21 are supported from the inner frame, the distance between the rear ends of the conveyors and the ground, that is, the distance through which the fingers 45 and the ground penetrating blade 50 must move, remains substantially constant even though the main supporting wheels 2 of the transplanter may raise or lower due to unevenness of the ground between the double rows of plants.

Also, it should be noted that by reason of the combined thrusting and tilting action imparted to the ground penetrating blades 50, holes may be made in mulch paper without unduly tearing or damaging the paper beyond the amount necessary to receive the plant.

Many other embodiments of this invention may be resorted to without departing from the spirit of the invention.

I claim:

1. A transplanting machine for handling plants and shoots, said machine comprising: a carriage structure including a main frame, a subframe pivotally connected with the main frame, and wheels independently supporting said frames; a conveyor system carried by said main frame including a plant-feeding conveyor unit having a discharge end supported by said subframe, said plant-feeding conveyor including a plurality of yieldable plant-holding elements; a transplanter unit oscillatably mounted on said sub-frame and movable between a ground-engaging plant-depositing position and an elevated plant-receiving position adjacent the discharge end of said plant-feeding conveyor, said transplanter unit including plant-gripping elements operable to engage and withdraw a plant from a plant-holding element of said feeding conveyor and release said plant when said transplanter unit occupies its plant-depositing position and a ground-penetrating blade for penetrating the ground to form an opening for a plant carried by said plant-gripping elements.

2. A transplanting machine for handling plants and shoots, comprising: a carriage structure; a plant-feeding conveyor unit carried thereby and including a plurality of plant-holding elements, each element adapted to engage yieldably a plant by its leafy portion, said conveyor adapted to move said plants by means of said elements successively into rearwardly directed positions; a transplanter unit oscillatably supported by said carriage structure, said transplanter unit including plant-gripping fingers movable between a plant-receiving position to engage and withdraw a rearwardly directed plant from a plant-holding element and a plant-depositing position adjacent the ground, said transplanter unit also including a ground-penetrating blade extensibly and tiltably mounted with respect to said plant-gripping fingers and means for extending and tilting said blade as said plant-gripping fingers approach the ground to penetrate the ground to form an opening therein for receiving the plant carried by said fingers.

3. A transplanting machine for handling plants and shoots, comprising: a carriage structure; conveyor means carried thereby and including a plurality of yieldable plant holding elements; an oscillatable transplanter unit carried by said carriage and movable about a horizontal axis between said conveyor and the ground and including gripping elements and control means therefor for causing said gripping elements to grip and draw plants in succession from said holding elements and to deposit said plants in the ground, said transplanter unit also including a ground-penetrating blade oscillatable with said gripping elements and extensible from said gripping elements to penetrate the ground and form an opening for the reception of a plant carried by said gripping elements.

4. A transplanting machine for handling plants and shoots, comprising: a carriage structure adapted for continuous travel over the ground; a pair of conveyor means carried thereby, each including a plurality of plant holder elements adapted to yieldably retain plants; a pair of transplanter units carried by said carriage, each transplanter unit movable between a plant-receiving and a plant-depositing position; means for operating said transplanter units alternately and means for driving said conveyor means in synchronism with their respective transplanter units; each transplanter unit including fingers adapted to grip and withdraw plants from said holder elements and carry said plants to the ground and a ground-penetrating blade said transplanter unit also including means for thrusting said ground-penetrating blade into the ground to prepare a hole for reception of a plant delivered thereto by said gripping fingers and means for simultaneously tilting said ground-penetrating blade to compensate for travel of said carriage.

5. A transplanting machine, comprising: a carriage structure adapted for continuous travel over the ground; a conveyor unit mounted thereon including a series of plant-holding elements, said elements adapted to yieldably engage plants by their leafy portions with their root ends extending laterally with respect to the carriage and move said plants into substantial alignment with the direction of travel of the carriage structure; a transplanter unit carried by said carriage and including gripping fingers movable between a plant-receiving position wherein said fingers grasp plants in succession from said conveyor and a planting position wherein said plants are inserted in the ground; said transplanter unit also including a ground-penetrating blade and means for extending said ground-penetrating blade beyond said fingers to prepare holes in the ground for reception of said plants and means for simultaneously tilting said ground-penetrating blade to compensate for travel of said carriage.

6. A transplanting machine for handling plants and shoots, comprising: a carriage structure adapted for continuous travel over the ground; a conveyor carried thereby having a rear discharge end and including a plurality of plant-holder elements; a shaft carried by said carriage structure and positioned adjacent and below said discharge end of said conveyor; a transplanter unit oscillatable about said shaft; a crank device for oscillating said transplanter unit between a plant-receiving and a plant-depositing position; said transplanter unit including plant gripping fingers and cam control means for causing said fingers to grasp plants from the holder elements of said conveyor and deposit them in the ground as said transplanter unit is oscillated, said transplanter unit also including a ground-penetrating blade oscillatable with said gripping fingers and cam control means for extending said blade as said fingers move to their plant-depositing position and causing said blade to penetrate the ground to form holes for said plants and means for tilting said blade to compensate for travel of said carriage.

7. A transplanting machine as set forth in claim 6 wherein: a pair of conveyor units is mounted side by side; a pair of said transplanter units is employed to remove plants from their respective conveyors; and a driving mechanism coordinates said conveyors and transplanter units whereby said transplanter units move alternately.

8. A transplanting machine, comprising: a carriage including a main frame, main wheels supporting said main frame, a sub-frame pivotally secured to said main frame, an auxiliary wheel supporting said sub-frame; said main wheels adapted to straddle a pair of planting rows, said auxiliary wheel adapted to move between said rows; a pair of coplanar conveyor units supported by said main frame and having discharge ends supported by said sub-frame whereby said discharge ends move with said sub-frame, each conveyor unit including a plurality of plant-holding elements for carrying plants to the discharge end of its conveyor unit; a transplanter unit for each conveyor unit carried by said sub-frame and movable between the discharge end of its corresponding conveyor unit and the ground, each transplanter unit including means for withdrawing plants from said plant-holding elements for transfer to the ground and means for forming plant-receiving openings in the ground.

9. A transplanting machine, comprising: a carriage structure adapted for continuous travel over the ground; a conveyor for plants carried thereby; an oscillatable transplanting unit carried by said carriage; means for oscillating said transplanting unit between a plant-receiving and a plant-depositing position; said transplanting unit including plant-engaging elements and means for controlling said elements for causing said elements to withdraw plants from said conveyor and deliver said plants into the ground as said transplanting unit is oscillated; said transplanting unit also including a ground-penetrating blade and operating means therefor for extending said blade as said plant-engaging elements move toward their plant-depositing position to cause said blade to penetrate the ground in advance of depositing the plant and tilting means for tilting said blade to compensate for travel of said carriage structure.

10. A transplanting machine as set forth in claim 8, wherein a pair of said conveyors is mounted side by side; a pair of said transplanter units are employed to remove plants from their respective conveyors; and driving mechanisms coordinate said conveyor and transplanter units whereby said planter units move alternately.

11. A transplanting machine, comprising: a carriage structure adapted for continuous travel over the ground; a conveyor unit carried thereby and including a plurality of plant-holding units movable in succession to a predetermined position; a transplanting unit having plant-engaging means and oscillatable between a position for receiving plants from said plant-holding units and a position for depositing said plants in the ground; said transplanting unit including a ground-piercing blade oscillatable therewith and movable relative thereto between a retracted and an extended position and means for actuating said blade to cause said blade to enter the ground in advance of said plants to prepare holes therefore and means for tilting said blade to compensate for travel of said carriage.

12. A transplanting machine comprising: a carriage structure adapted for continuous travel over the ground; a conveyor unit carried thereby and including a plurality of plant-holding units movable in succession to a predetermined position; an oscillatable transplanter unit carried by said carriage, said transplanter unit including plant-gripping means and a ground-penetrating blade, means for oscillating said transplanter unit in synchronism with movement of said conveyor to cause said plant-gripping means to withdraw plants from said plant-holding means as said means move to their predetermined positions and deposit said plants in the ground, said transplanter unit also including means for operating said penetrating blade to cause said blade to move in advance of said plant and prepare a hole therefor and means for tilting said blade to compensate for travel of said carriage.

CHARLES V. MORINE.

REFERENCES CITED

The following references are of record in the file of this patent:

UNITED STATES PATENTS

| Number | Name | Date |
|---|---|---|
| 92,961 | Holbert | July 27, 1869 |
| 156,545 | Davis | Nov. 3, 1874 |
| 438,155 | Hatherell | Oct. 14, 1890 |
| 469,506 | Simmons | Feb. 23, 1892 |
| 491,597 | Sailer | Feb. 14, 1893 |
| 558,849 | Schell | Apr. 21, 1896 |
| 577,539 | Speidel | Feb. 23, 1897 |
| 1,368,486 | Chaney | Feb. 15, 1921 |
| 1,928,362 | Schutmaat | Sept. 26, 1933 |
| 1,963,591 | Pomieraniec | June 19, 1934 |
| 1,996,686 | Poll | Apr. 2, 1935 |

FOREIGN PATENTS

| Number | Country | Date |
|---|---|---|
| 255,353 | Italy | Oct. 18, 1927 |
| 290,399 | Italy | Nov. 17, 1931 |
| 292,052 | Germany | May 20, 1916 |
| 321,433 | Germany | June 3, 1920 |